(12) United States Patent
Hernandez

(10) Patent No.: US 7,404,376 B2
(45) Date of Patent: Jul. 29, 2008

(54) FEED DISPENSER UNIT

(76) Inventor: Harvey Hernandez, 4646 Wales, Corpus Christi, TX (US) 78413

( * ) Notice: Subject to any disclaimer, the term of this patent is extended or adjusted under 35 U.S.C. 154(b) by 296 days.

(21) Appl. No.: 11/447,906

(22) Filed: Jun. 7, 2006

(65) Prior Publication Data

US 2006/0283396 A1    Dec. 21, 2006

Related U.S. Application Data

(60) Provisional application No. 60/689,076, filed on Jun. 10, 2005.

(51) Int. Cl.
*A01K 5/00* (2006.01)
(52) U.S. Cl. .................... 119/57.91; 119/51.13
(58) Field of Classification Search ............ 119/51.01, 119/51.02, 51.04, 51.11, 51.13, 52.1, 56.1, 119/57.1, 573.91, 57.92, 61.2, 230; 239/7, 239/650, 682, 687, 688, 681; 222/650, 185.1, 222/181.1; D30/121, 122, 124
See application file for complete search history.

(56) References Cited

U.S. PATENT DOCUMENTS

| | | | |
|---|---|---|---|
| 396,251 | A | 1/1889 | Adamson |
| 2,632,423 | A | 3/1953 | Cordis |
| 3,780,701 | A | 12/1973 | Wentworth, Sr. |
| 4,497,446 | A | 2/1985 | van der Lely et al. |
| 4,986,320 | A | 1/1991 | Kesterman et al. |
| 5,143,289 | A | 9/1992 | Gresham et al. |
| 5,223,137 | A | 6/1993 | Hattori et al. |
| 5,333,572 | A | 8/1994 | Nutt |
| 6,375,035 | B1 | 4/2002 | Munroe |
| 6,763,781 | B1 | 7/2004 | Norrell |

*Primary Examiner*—T. Nguyen
(74) *Attorney, Agent, or Firm*—Richard C. Litman

(57) ABSTRACT

The feed dispenser unit is designed for attachment to a vertical rotating shaft of a control unit of an animal feeder and has a base plate, a plurality of upright walls, and a shaft attachment member. The base plate is for receiving and holding feed that has been released from the animal feeder. The feed is further supported inside the unit with a plurality of upright walls. The upright walls are hingedly disposed around the periphery of the base plate, creating a substantially enclosed unit with only top access for feed from the animal feeder storage unit of hopper. The shaft attachment member is disposed below the base plate for attaching the base plate to the rotating shaft of the control unit. When the rotating shaft rotates, the base plate spins, forcing the upright walls into a substantially horizontal position due to centrifugal force, allowing the feed to be dispensed.

6 Claims, 10 Drawing Sheets

US 7,404,376 B2

FEED DISPENSER UNIT

CROSS-REFERENCE TO RELATED APPLICATION

This application claims the benefit of U.S. Provisional Patent Application Ser. No. 60/689,076, filed Jun. 10, 2005.

BACKGROUND OF THE INVENTION

1. Field of the Invention

The present invention relates to animal and wildlife feeders, and more specifically to a spinning feed dispenser unit for use with animal and wildlife feeders.

2. Description of the Related Art

In the current art of animal and wildlife feeders, it is typical for the feeder to have a motorized control unit that intermittently rotates a vertically oriented shaft to which is attached a spinner plate. The spinner plate is positioned beneath a feed storage unit, the storage unit allowing feed to discharge through a tube directed onto the spinner plate. The spinner plate is typically rotated for about 8 seconds, twice a day, leaving the spinner plate stationary for long periods of time with a full load of feed from the feed storage unit. When the control unit shaft rotates the spinner plate the feed is thrown from the plate, in response to the centrifugal forces generated by the rapid spinning of the spinner plate.

Thieving birds and small animals have plagued feeder operators for years. For example, spinner plates leave substantial amounts of feed exposed to such animals, either near the discharge tube, on the top of the spinner plate, generally, or at the spinner plate discharge openings, where the openings allow birds to insert their heads into the opening to gain access to the feed.

Many existing spinner plates are highly subject to wind dislodging feed from the spinner plate while the spinner plate is stationary. Feed dislodged in this manner lands beneath, or much too close to the feeder, resulting in substantial loss of feed, to the point that the feed storage unit can be emptied by the continued discharge of feed onto a spinner plate cleared by the wind. Feeders are often left unattended for extended periods of time, and this problem can cause a feeder to be emptied and useless for long periods of time.

There is a need for a spinning feeder plate that protects the stored feed from being accessed by birds and other small animals, yet is capable of dispensing the feed in an efficient manner. It is desirable that the unit has sidewalls that protect the feed while the unit is stationary and are forced open by centrifugal forces while the unit is in motion, scattering the feed in the desired manner. Thus a feed dispenser unit solving the aforementioned problems is desired.

SUMMARY OF THE INVENTION

The feed dispenser unit of the present invention is designed for attachment to a vertical rotating shaft of a control unit of an animal feeder and has a base plate, a plurality of upright walls, and a shaft attachment member.

The base plate is for receiving and holding feed that has been released from the animal feeder. The feed is further supported inside the unit with a plurality of upright walls. The upright walls are hingedly disposed around the periphery of the base plate, creating a substantially enclosed unit with only top access for feed from the animal feeder storage unit of hopper.

The shaft attachment member is disposed through and below the base plate for attaching the base plate to the rotating shaft of the control unit. The control unit includes a motor that allows the shaft to rotate. When the rotating shaft rotates, the base plate spins, forcing the upright walls into a substantially horizontal position due to centrifugal forces, allowing the feed to be dispensed.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
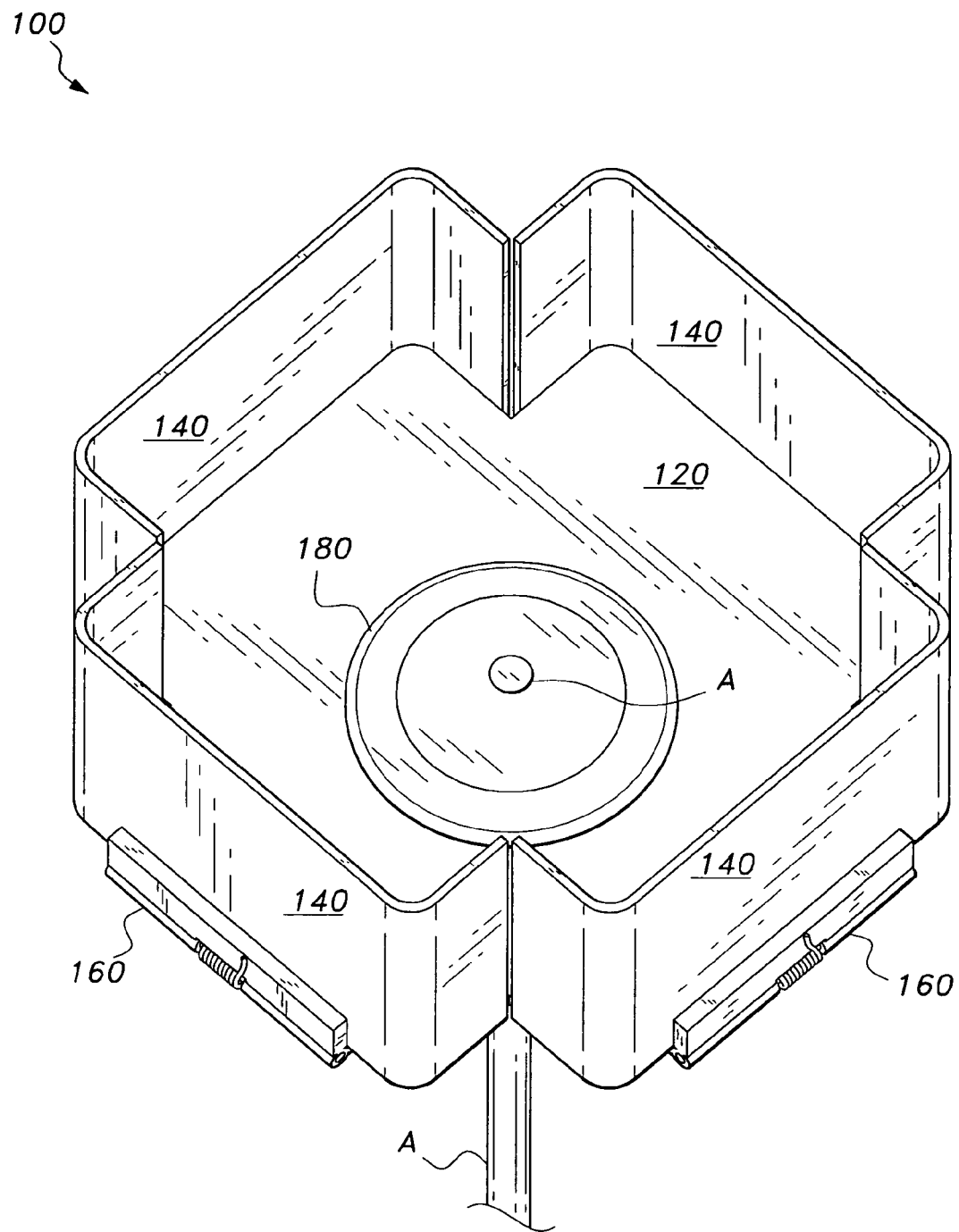
FIG. 1 is a perspective view of a feed dispenser unit in a closed position according to the present invention.

The present invention is a feed dispenser unit for attachment to a vertical rotating shaft of a control unit of an animal feeder, in which a preferred embodiment is designated generally as 100 in the drawings.

Figure 2:
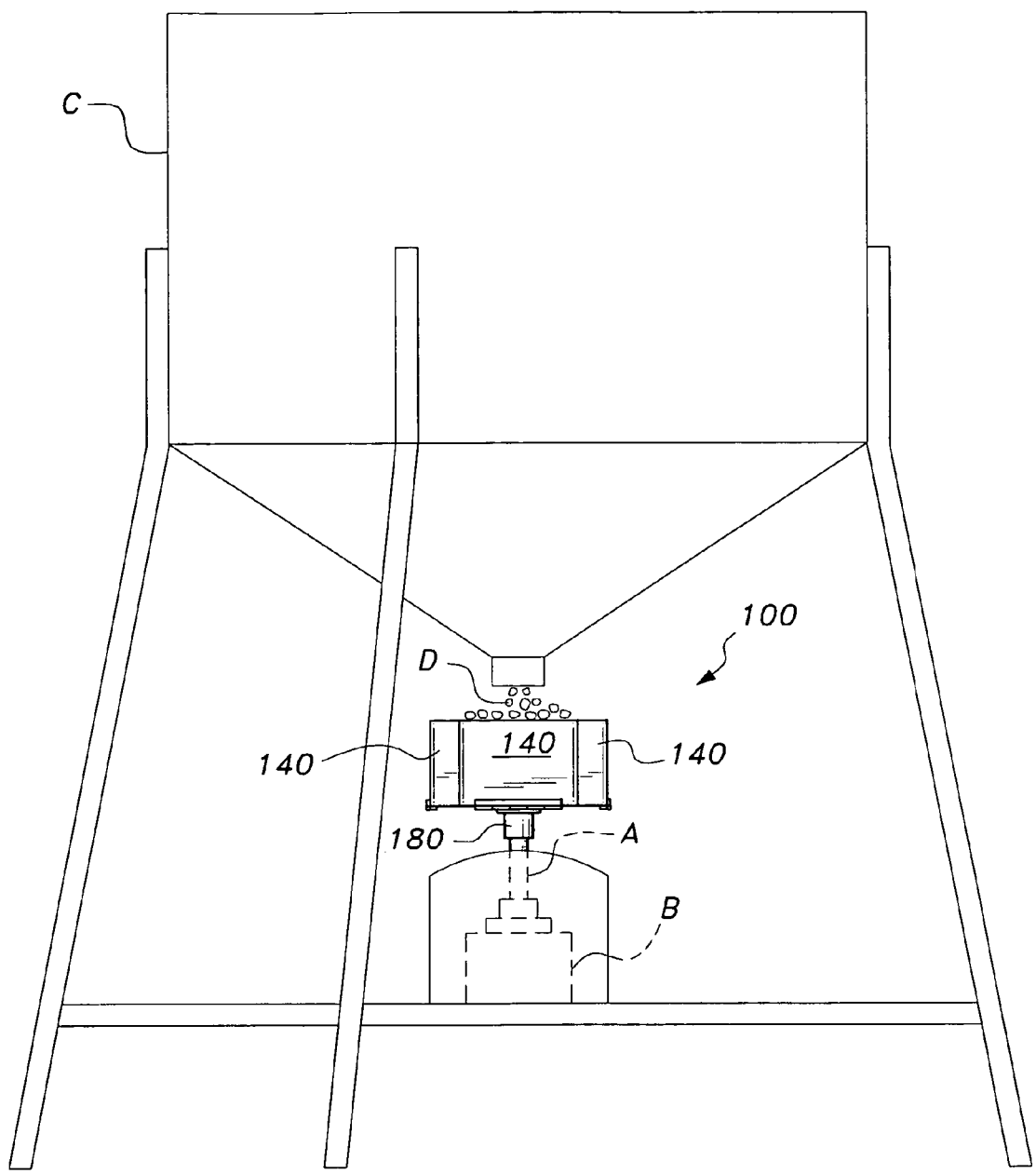
FIG. 2 is an environmental view of the feed dispenser unit according to the present invention.

Referring to FIGS. 1 and 2 of the drawings, feed dispenser unit 100 includes a horizontal base plate 120, upright walls 140, and shaft attachment member 180. Each upright wall 140 is hingedly connected to a peripheral edge of base plate 120 such that base plate 120 and upright walls 140 form a partially enclosed structure for receiving and holding feed D that has been released from the animal feeder storage unit C while feed dispenser unit 100 is in a stationary position. Upright walls 140 abut one another as to form a continuous outer wall, with the base plate 120 and the continuous outer wall forming an enclosure having a top opening for receiving feed from the animal feeder storage unit C. Base plate 120 may be of any geometric shape, with connected upright walls 140 being contoured as to form a substantially continuous outer wall and resulting open-toped enclosure, thus preventing feed from being evacuated from feed dispenser unit 100 while it is in a stationary, unused position.

In the preferred embodiment, upright walls 140 are hinged to base plate 120 with the use of spring hinges 160 that are each secured along an outside surface of the respective upright wall 140 and bottom portion of base plate 120. Shaft attachment member 180 is disposed through and below base plate 120 and is provided for attaching feed dispenser unit 100 to the substantially vertical shaft A on the animal feeder. Vertical shaft A can be rotated, generally by a motor located in the control unit B of the animal feeder.

Figure 3:
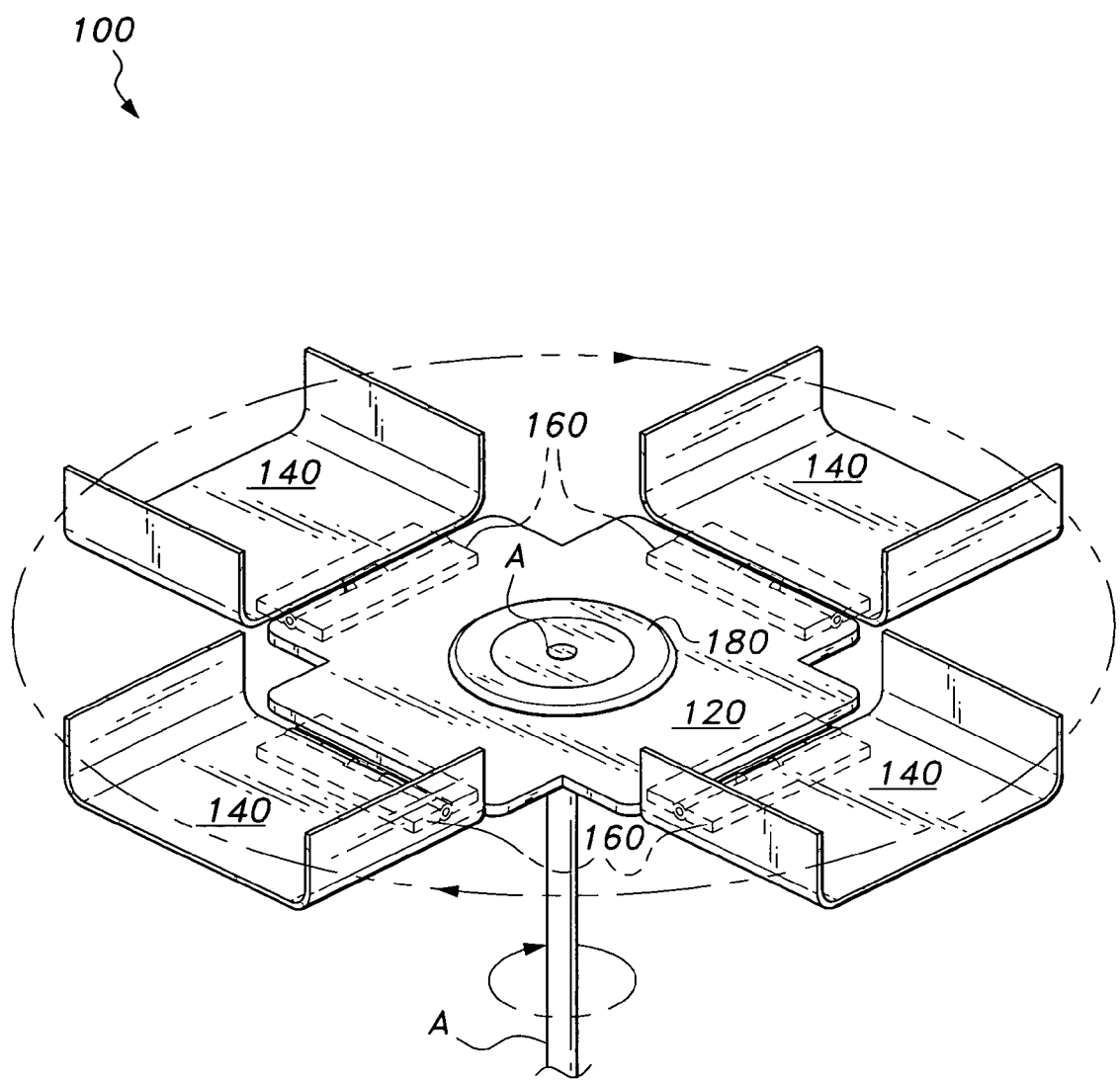
FIG. 3 is a perspective view of a feed dispenser unit in an opened and dispensing position according to the present invention.

FIG. 3 shows feed dispenser unit 100 in an open and operating position. Shaft attachment member 180 is attached to vertical shaft A such that, when vertical shaft A is rotated, base plate 120 of feed dispenser unit 100 is rotated in a similar manner. As base plate member 120 rotates, centrifugal forces act upon feed dispenser unit 100 such that upright walls 140 are opened along spring hinges 160 to a substantially horizontal orientation, positioning feed dispenser unit 100 in an open and operable position, allowing any feed being stored to be distributed in the desired manner. In the preferred embodiment, shaft attachment member 180 is integral with base plate 120 by means of a press fit of similar hold. In alternate embodiments, shaft attachment member 180 may be connected to base plate 120 with the use of screws or other fasteners.

Figure 4:
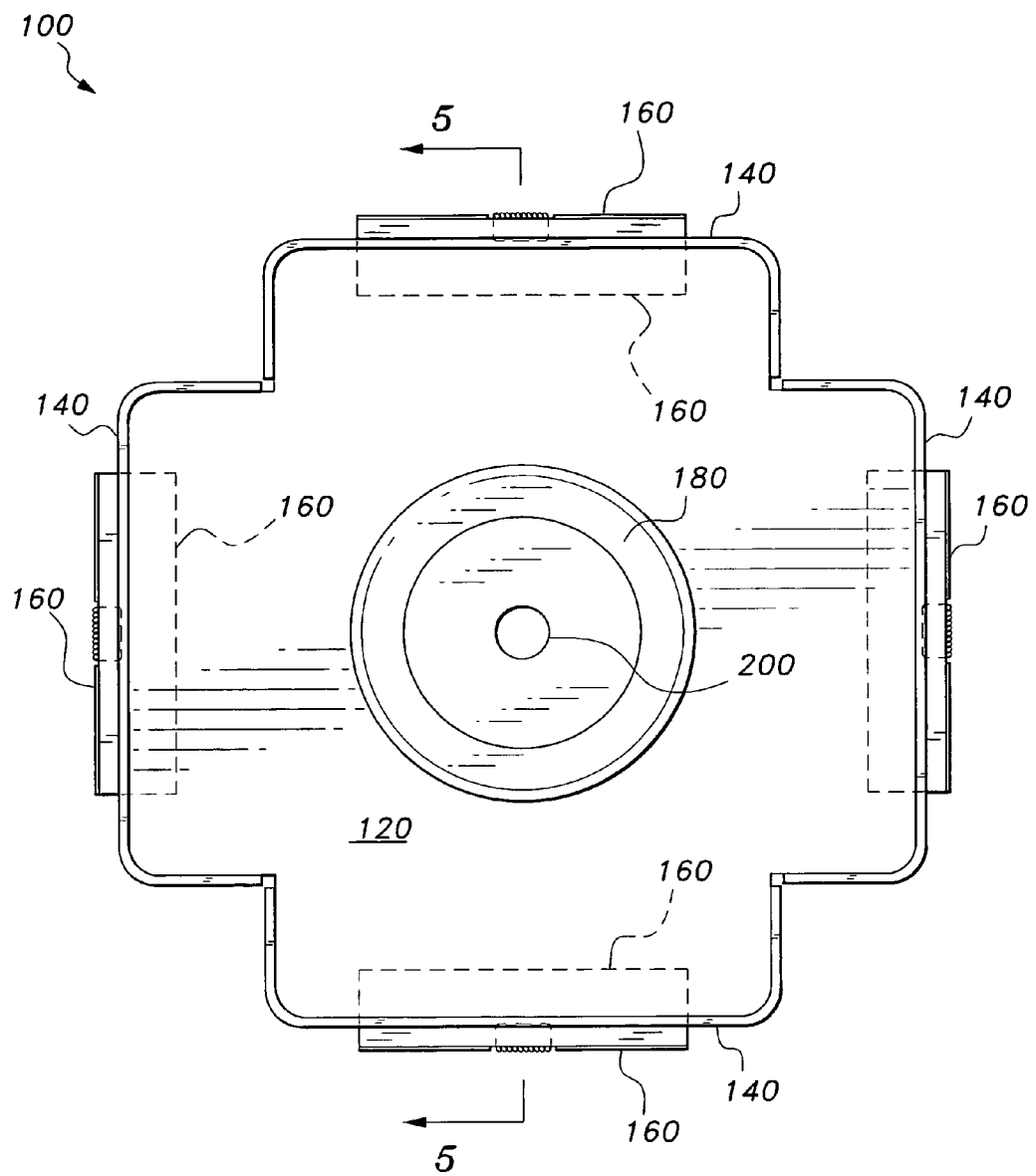
FIG. 4 is a top view of a feed dispenser unit according to the present invention.
Figure 5:
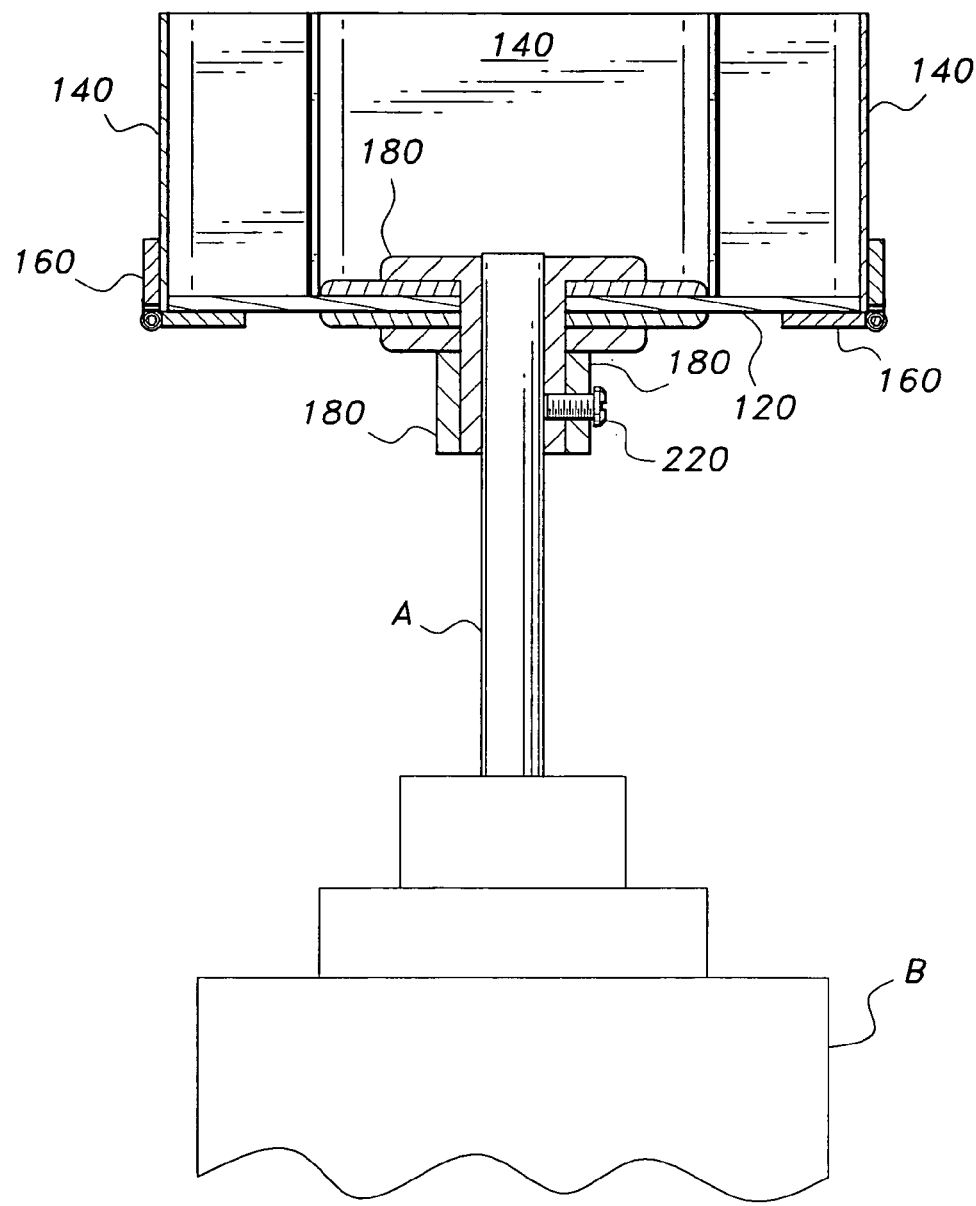
FIG. 5 is a sectional view taken along cutting plane 5-5 as shown on FIG. 4.

FIGS. 4 and 5 show feed dispenser unit 100. In the preferred embodiment, feed dispenser unit 100 has cross-shaped horizontal base plate 120 and four upright walls 140 attached with four spring hinges 160, along with a shaft attachment member 180. Upright walls 140 are contoured to abut one another such that base plate 120 and upright walls 140 form an enclosure having a top opening for receiving feed from the animal feeder storage unit and are oriented such that there is only access to the top portion of feed dispenser unit 100 when it is in a stationary position. Shaft attachment member 180 is secured to vertical shaft A with the use of a set screw 220.

Figure 6:
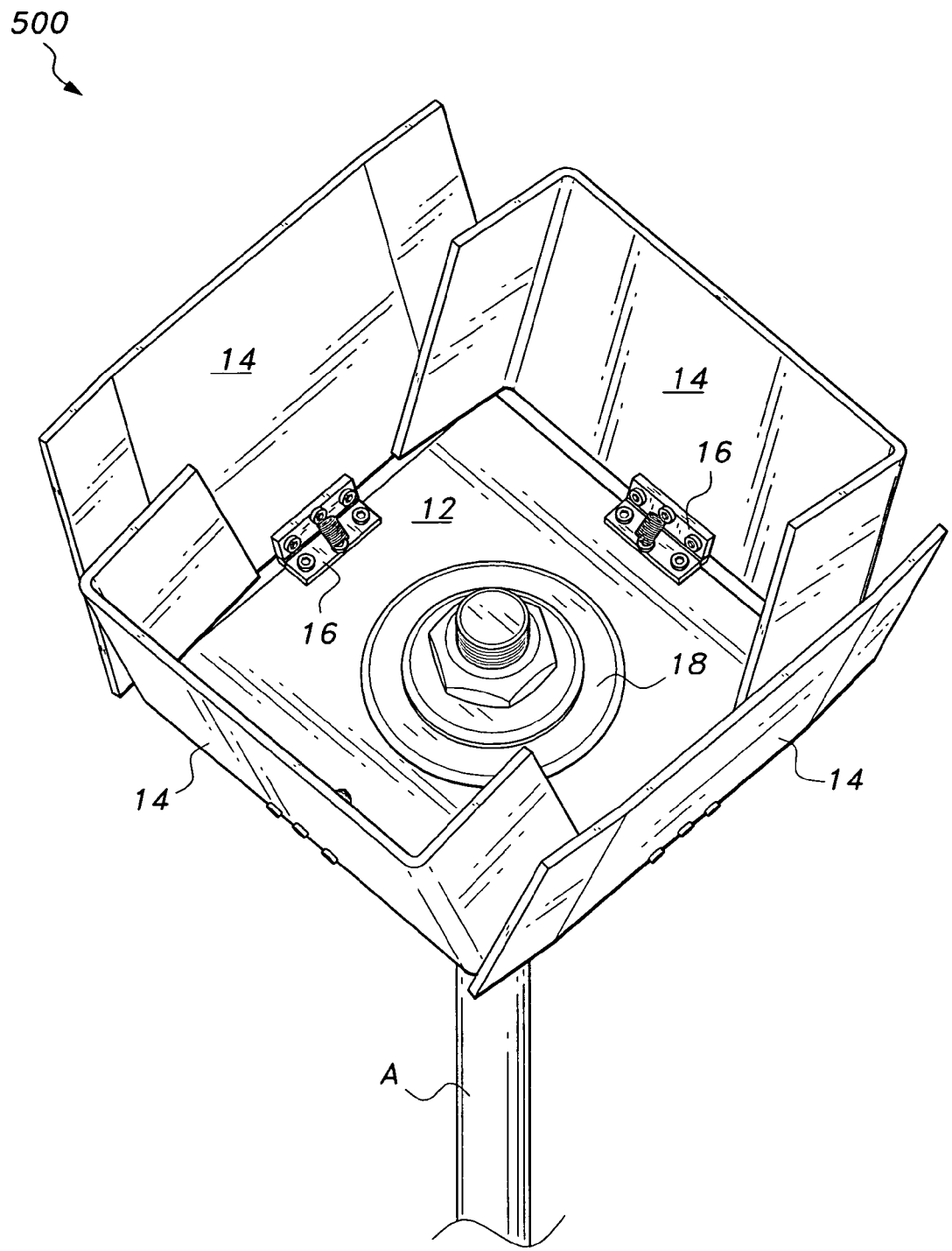
FIG. 6 is a perspective view of an alternate embodiment of a feed dispenser unit in a closed position according to the present invention.
Figure 7:
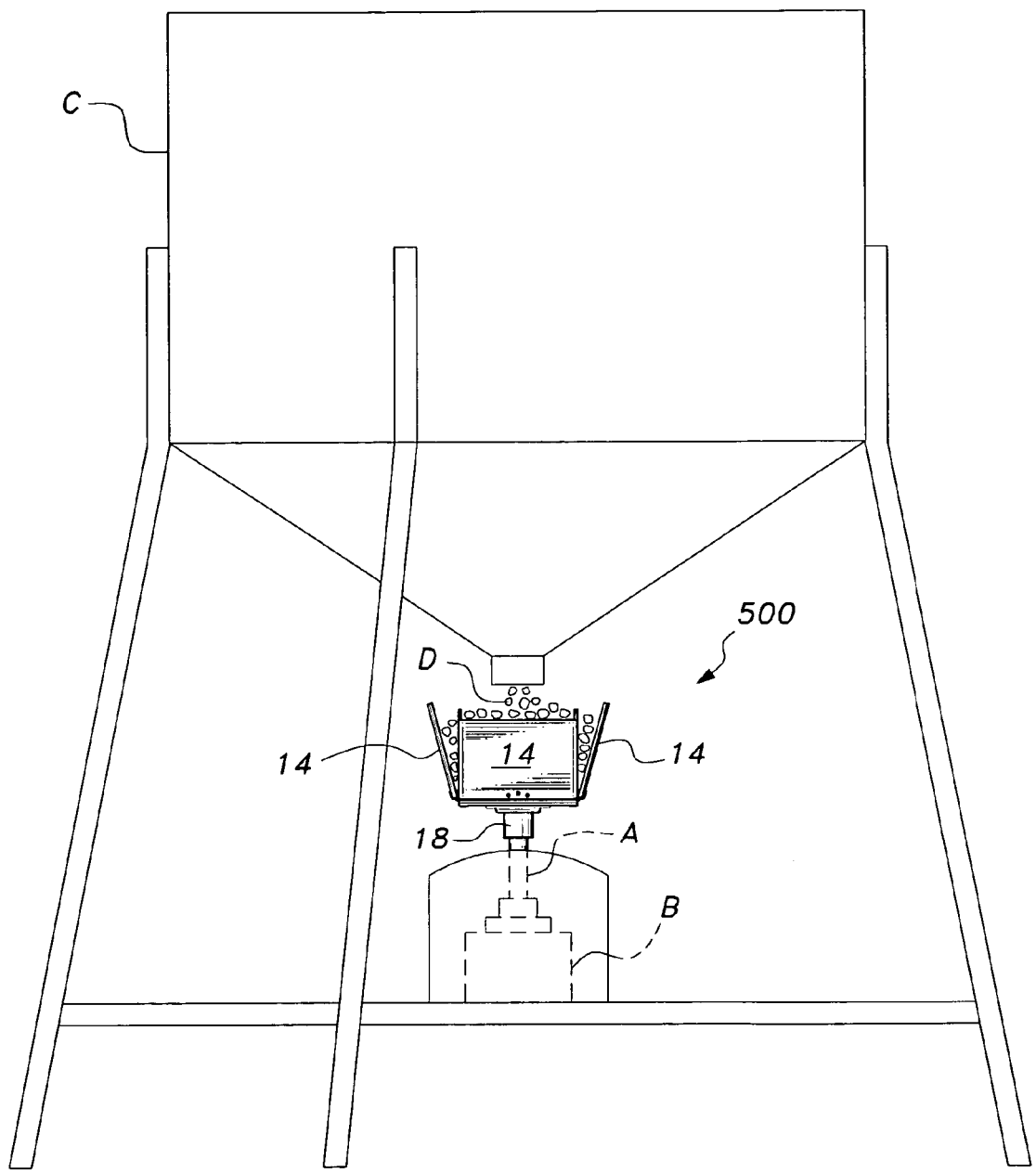
FIG. 7 is an environmental view of an alternate embodiment of a feed dispenser unit according to the present invention.

Referring to FIGS. 6 and 7 of the drawings, an alternate embodiment of feed dispenser unit 500 includes base plate 12, upright walls 14, and shaft attachment member 18. Upright walls 14 are hingedly connected to the peripheral edges of base plate 12 such that base plate 12 and upright walls 14 form a partially enclosed structure for receiving and holding feed D that has been released from the animal feeder storage unit C while feed dispenser unit 500 is in a stationary position. In this embodiment, upright walls 14 are hinged to base plate 12 with the use of spring hinges 16 that are each secured along an inside surface of the respective upright wall 14 and top portion of base plate 12.

Shaft attachment member 18 is disposed below base plate 12 and is provided for attaching feed dispenser unit 500 to the substantially vertical shaft A on the animal feeder. Vertical shaft A can be rotated, generally by a motor located in the control unit B of the animal feeder.

Figure 8:
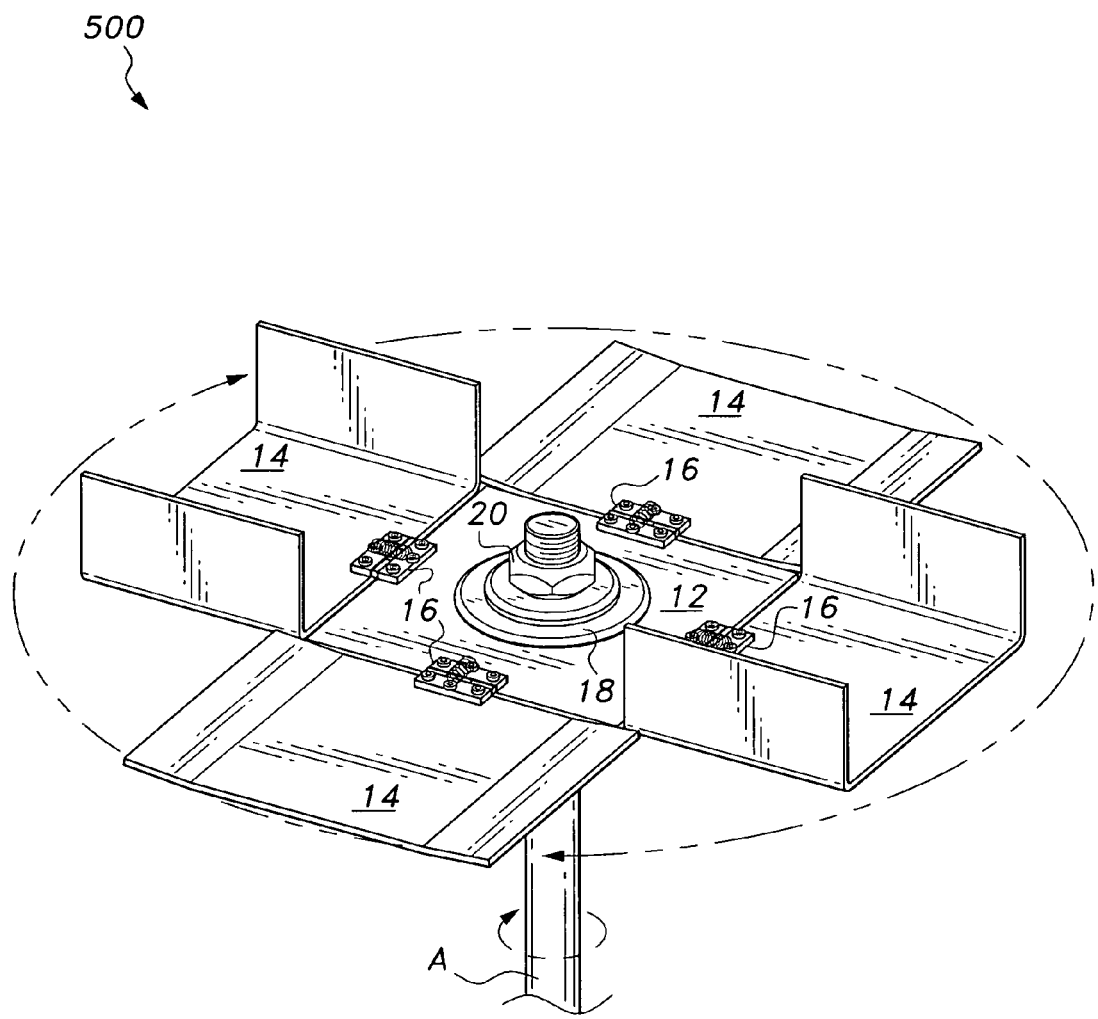
FIG. 8 is a perspective view of an alternate embodiment of a feed dispenser unit in an opened and dispensing position according to the present invention.

FIG. 8 shows feed dispenser unit 500 in an open and operating position. Shaft attachment member 18 is attached to vertical shaft A such that, when vertical shaft A is rotated, base plate 12 of feed dispenser unit 500 is rotated in a similar manner. As base plate member 12 rotates, centrifugal forces act upon feed dispenser unit 500 such that upright walls 14 are opened along spring hinges 16 to a substantially horizontal orientation, positioning feed dispenser unit 500 in an open and operable position, allowing any feed being stored to be distributed in the desired manner. In this embodiment, shaft attachment member 18 is connected to base plate 12 with the use of a fastener 20. In another alternate embodiment, shaft attachment member 18 may be an integral part of base plate 12.

Figure 9:
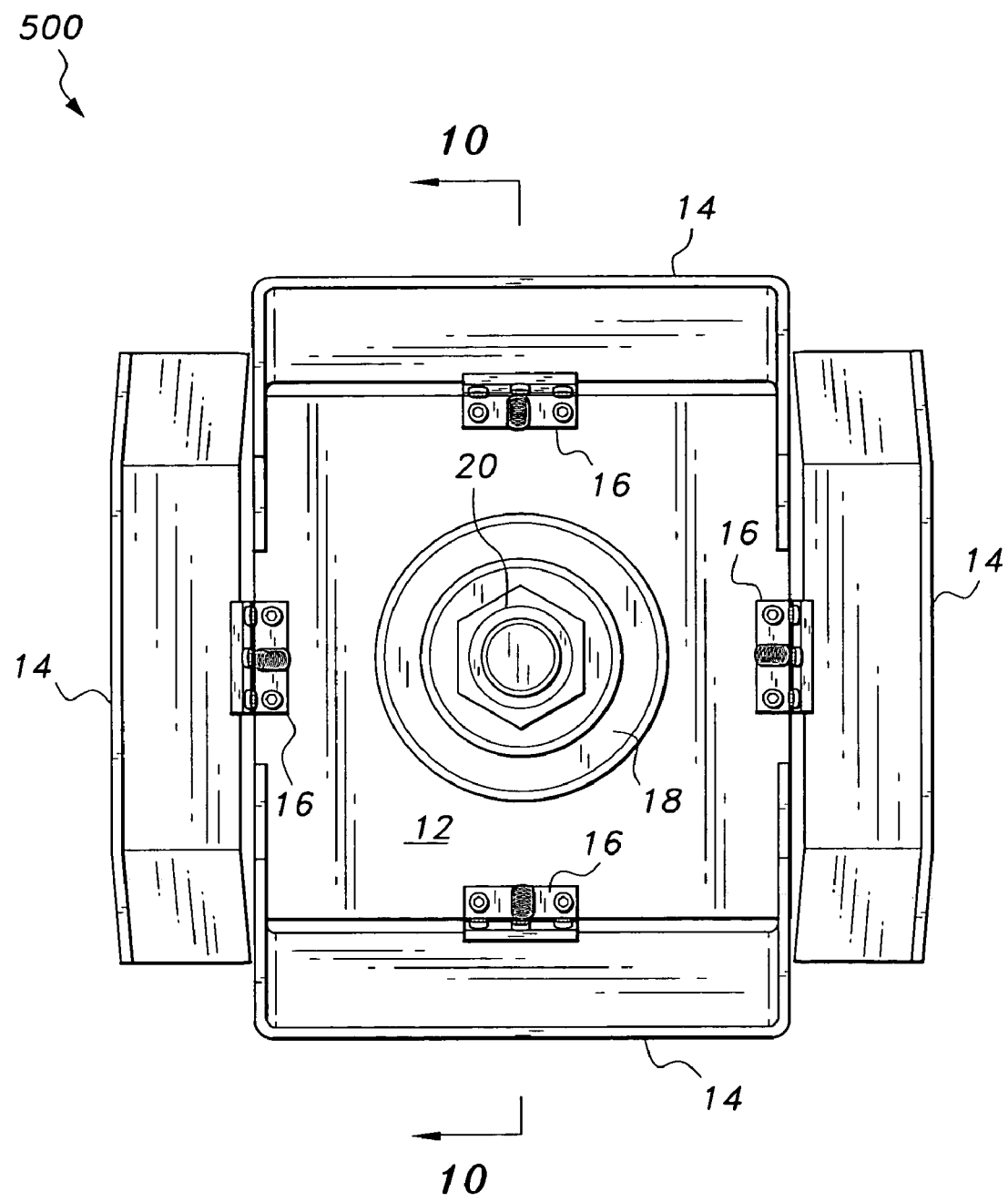
FIG. 9 is a top view of an alternate embodiment of a feed dispenser unit according to the present invention.
Figure 10:
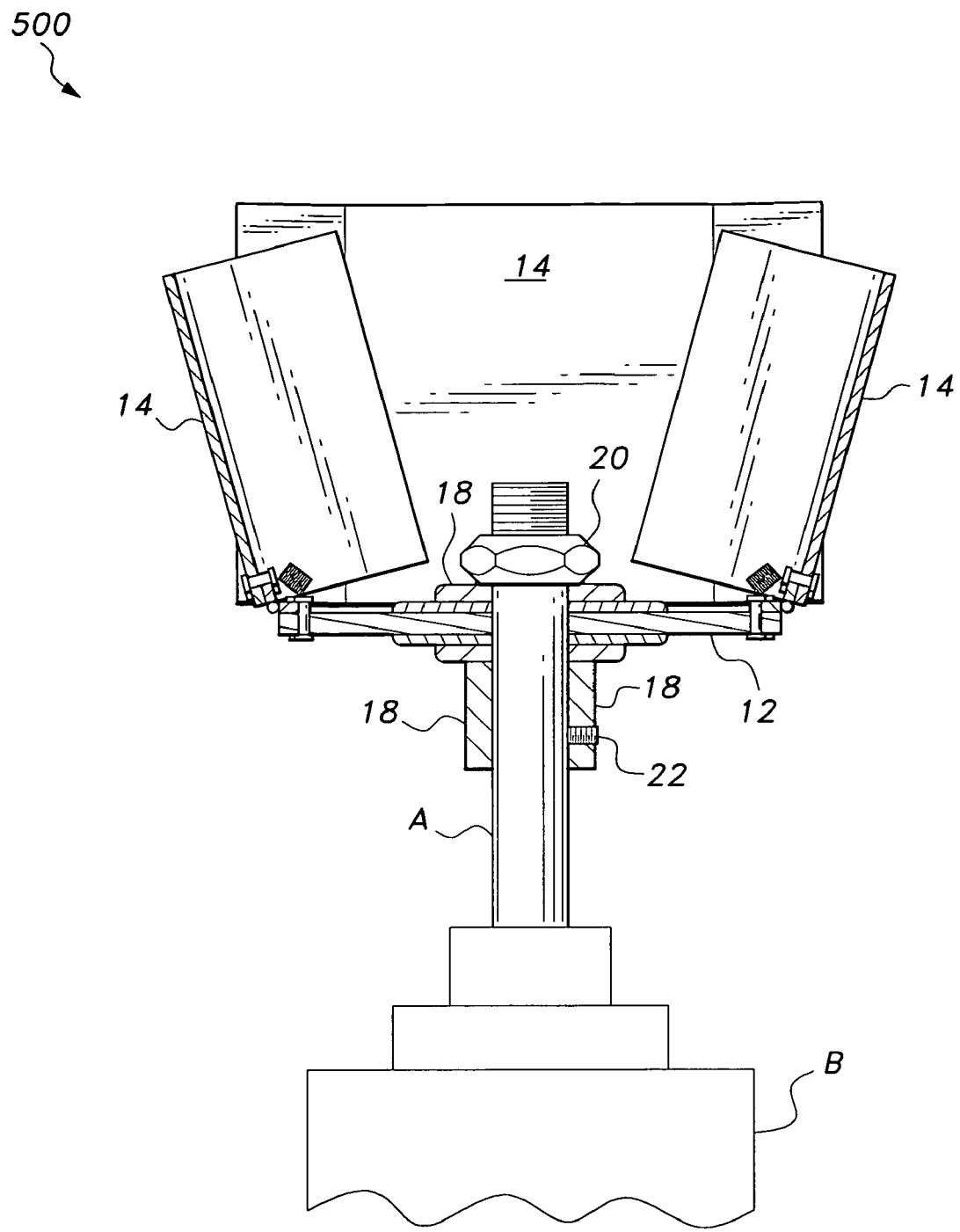
FIG. 10 is a sectional view taken along cutting plane 10-10 as shown on FIG. 9.

FIGS. 9 and 10 show feed dispenser unit 500. In this embodiment, feed dispenser unit 500 has a square base plate 12 and four upright walls 14 attached with four spring hinges 16, along with a shaft attachment member 18. Base plate 12 and upright walls 14 are oriented such that there is only access to the top portion of feed dispenser unit 10 when it is in a stationary position. Shaft attachment member 18 is secured to vertical shaft A with the use of a set screw 22.

It is to be understood that the present invention is not limited to the embodiments described above, but encompasses any and all embodiments within the scope of the following claims.

I claim:

1. A feed dispenser unit for attachment to a vertical rotating shaft of a control unit of an animal feeder, comprising:
   a base plate, the base plate, the plurality of upright walls abutting one another as to form a continuous outer wall, the base plate and the continuous outer wall forming an enclosure having a top opening for receiving feed from the animal feeder, the enclosure for retaining feed from the animal feeder for receiving feed from the animal feeder;
   a plurality of upright walls, each upright wall being hingedly connected to a peripheral edge of the base plate; and
   a shaft attachment member, the shaft attachment member being disposed through and depending from the base plate for attaching the base plate to the rotating shaft of the control unit, such that when the rotating shaft rotates, the base plate spins, forcing the upright walls into a substantially horizontal position, allowing the feed to be dispensed.

2. The feed dispenser unit according to claim 1, wherein each upright wall is hingedly connected to a peripheral edge of the base plate with a spring hinge.

3. A feed dispenser unit for attachment to a vertical rotating shaft of a control unit of an animal feeder, comprising:
   a horizontal base plate;
   a plurality of upright walls, each upright wall being hingedly connected to a peripheral edge of the horizontal base plate, the plurality of upright walls abutting one another as to form a continuous outer wall, the base plate and the continuous outer wall forming an enclosure having a top opening for receiving feed from the animal feeder, the enclosure for retaining feed from the animal feeder; and
   a shaft attachment member, the shaft attachment member being disposed through and depending from the horizontal base plate for attaching the horizontal base plate to the rotating shaft of the control unit, such that when the rotating shaft rotates, the horizontal base plate spins, forcing the upright walls into a substantially horizontal position, allowing the feed to be dispensed.

4. The feed dispenser unit according to claim 3, wherein each upright wall is hingedly connected to a peripheral edge of the base plate with a spring hinge.

5. A feed dispenser unit for attachment to a vertical rotating shaft of a control unit of an animal feeder, comprising:
   a horizontal base plate;
   a plurality of upright walls, each upright wall being hingedly connected to a peripheral edge of the horizontal base plate, the plurality of upright walls abutting one another as to form a continuous outer wall, the base plate and the continuous outer wall forming an enclosure having a top opening for receiving feed from the animal feeder, the enclosure for retaining feed from the animal feeder;
   a plurality of hinges disposed between the base plate and the plurality of upright walls, each hinge for hingedly connecting one of the upright walls to a peripheral edge of the horizontal base plate, each hinge biasing a connected upright wall into a vertical position; and
   a shaft attachment member, the shaft attachment member being disposed through and depending from the horizontal base plate for attaching the horizontal base plate to the rotating shaft of the control unit, such that when the rotating shaft rotates, the horizontal base plate spins, forcing the upright walls into a substantially horizontal position, allowing the feed to be dispensed.

6. The feed dispenser unit according to claim 5, wherein each of the plurality of hinges is a spring hinge.

* * * * *